Nov. 16, 1943.  M. YONAN-MALEK  2,334,665
METHOD AND CONTROL SYSTEM FOR TREATING AND CANNING RICE
Filed June 10, 1940
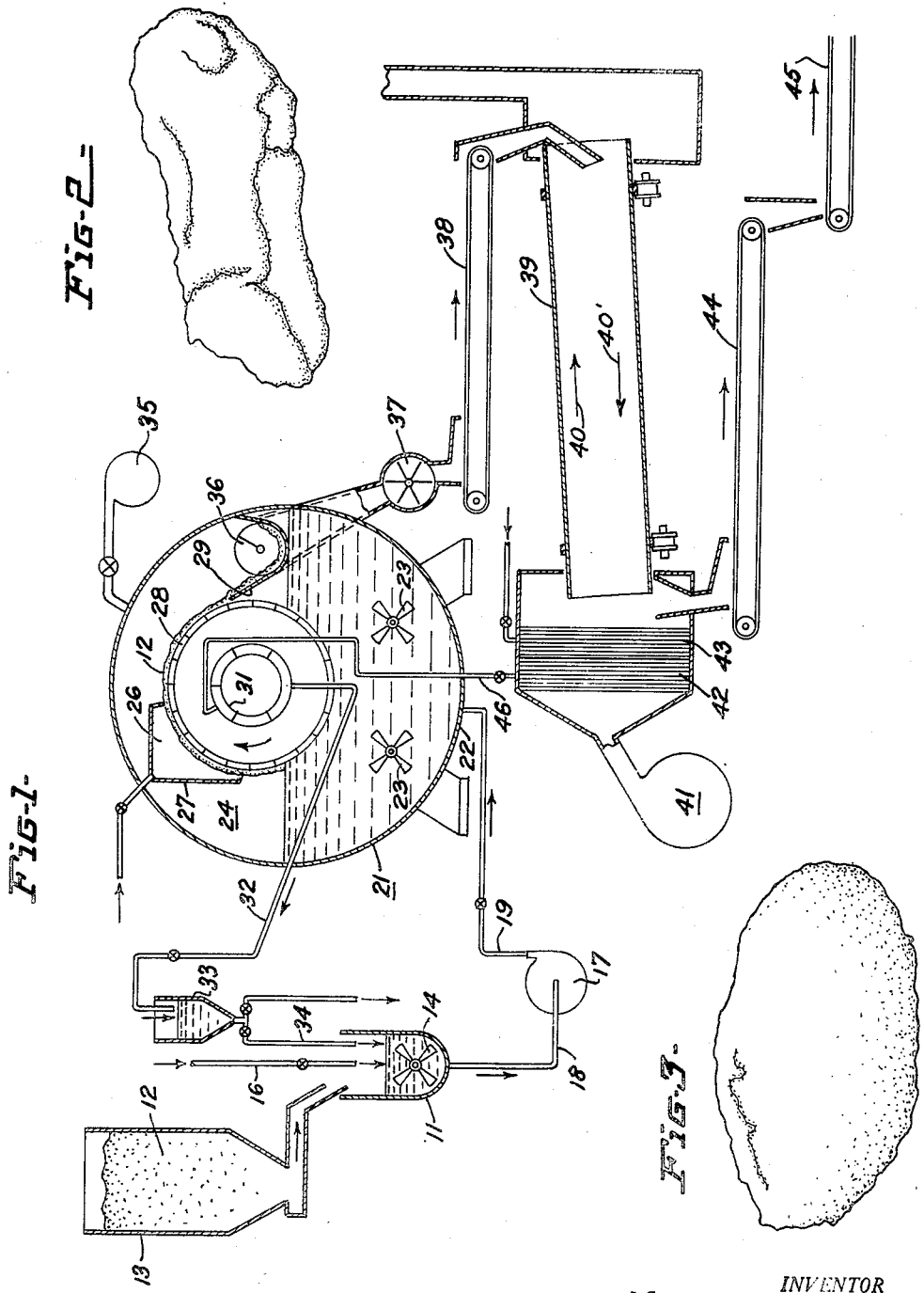
INVENTOR
MILTON YONAN-MALEK
BY
ATTORNEY Patented Nov. 16, 1943

2,334,665

UNITED STATES PATENT OFFICE 2,334,665

METHOD AND CONTROL SYSTEM FOR TREATING AND CANNING RICE

Milton Yonan-Malek, San Francisco, Calif.

Application June 10, 1940, Serial No. 339,718

3 Claims. (Cl. 99—186)

The invention, in general, relates to food canning processes. More particularly, the invention relates to canned boiled rice so treated and processed as to afford a thoroughly cooked, non-gelatinous, substantially white, non-pasty product high in nutritive value.

In comparatively recent years, due to the increased quantity of rice produced in this country, considerable attention has been given by various rice growers' associations, by government agricultural experimental stations, as well as by the canning industry, to ways and means for affording additional outlets for rice which is probably the most economical of any single food per unit of energy produced that is known. In general, two separate and distinct methods or processes of treating rice have heretofore been developed of which one is directed to the treatment, cooking and canning of raw milled rice while the other is directed to the parboiling of the paddy or rough rice prior to milling and cooking. One process, recently developed, of treating and cooking milled raw rice comprises, briefly, the steps of feeding the hulled rice in a spread-out mass condition through steam under pressure and at a temperature in the neighborhood of 100° C., and adding water thereto while subjected to the action of the steam. This treatment, it is said, hydrolizes the starch uniformly throughout the grains and prevents cell rupture thereof. Another process of treating raw milled rice for canning is somewhat more complex and comprises the steps of blanching batches of such rice in a steam bath that has been acidified with a slight amount of acetic acid to prevent excessive starch flow from the grains, the bath serving to soften the grains, stirring the batch continuously in the bath to insure uniformity of treatment of all grains, washing the blanched, pre-cooked rice in clean, cool water to arrest the action of the blanch and to prevent the rice from becoming matted and soggy, draining off excess water and dipping in a cold brine to overcome bland flavor, filling the drained, pre-cooked rice into cans, closing the cans under a vacuum, and then cooking for from one to one and a half hours at approximately 240° F. The product is a somewhat gelatinous mass which has the disadvantage of failing to keep for any appreciable length of time, the partly gelatinous mass losing its jelly-like consistency and becoming hard and granular, possibly due to retrogression of the starch. No method has as yet been found to overcome this disadvantage, with the result that packing cannot get too far ahead of orders thus avoiding long storage.

With respect to prior methods of treating the paddy or rough rice, it is probably well known that parboiling of the paddy has been carried on for hundreds of years. Briefly, this has consisted of soaking the paddy in either cold, warm or hot water for periods ranging from twenty to one hundred and ninety two hours, draining off excess water, and then steaming the paddy until the hulls have opened slightly. After steaming, the parboiled rice is thoroughly dried in the sun, or artificially, and then milled. Methods of parboiling vary widely in the various rice growing countries of the world and with little precision as to the treatment; the parboiling depending to a large extent on the character of the paddy and whether it be long, medium or short grain varieties and the local climate. Some years ago, but comparatively recently, an improved method of parboiling rice grown in this country was developed, the process consisting of soaking the paddy in water for a period ranging between four and twelve hours until the rice has absorbed as much of the water as is possible, removing excess water, cooking the rice in live steam under pressure for from fifteen minutes to an hour, more or less, then heat drying the cooked rice until all water that has been taken up in the soaking and steaming has been removed, and at a temperature sufficient to parch the rice. Thereafter, the rice is milled and packed in hermetically sealed containers. See, in this connection, United States Letters Patent to Baumgartner, No. 1,239,555, of September 11, 1917. In addition to the foregoing known methods, a canned boiled rice has recently appeared on the market which is apparently of the long-grain variety; the product being a relatively stiff, gelatinous mass of brownish color which, upon warming for eating, produces grains that are somewhat gritty, and, hence, unpalatable.

A primary object of this invention is to provide an improved process and system of treating rice to provide a canned product that is non-gelatinous, non-pasty, light in color, and which does not become gritty.

Another object of the invention is to provide an improved process and control system for not only treating rough rice or paddy but also for canning boiled rice so as to afford a uniform product of the above mentioned characteristics.

A still further object of the improvement is to provide a commercially economical process and control system of the indicated nature which affords an increased percentage of head rice and the presentation of the rice in a highly satisfactory condition for milling as well as for subsequent cooking either in cans or in bulk.

Another object of the present invention is to provide a system of treating the rice paddy for subsequent milling and canning which insures substantially uniform results regardless of the type or variety of rice treated.

The foregoing and other objects are attained by the improved process and control system hereinafter described, a preferred embodiment of the system being depicted in the accompanying drawing in which:

Figure 1 is a schematic flow sheet depicting a preferred embodiment of a system embracing the improved process of treating rice.

Figure 2 is an enlarged elevational view of a raw, rice grain after milling and cooked but not treated in accordance with the improved process.

Figure 3 is an enlarged, elevational view of a rice grain that has been treated in accordance with the improved process, milled, cooked and canned.

In the form shown, the apparatus for handling and treating rice preferably comprises means for soaking rough rice or paddy in water for a predetermined time interval and thereby provide a rice slurry; a rice conditioner including a tank; means for delivering said rice slurry to said tank at the end of a predetermined time interval; means in said conditioner for isolating the paddy from the soak water; means in said conditioner for subjecting the isolated paddy to steam at a predetermined pressure and for a predetermined time interval thereby to temper the grain and to parboil the rice; means in said conditioner for removing a portion of the water content of the parboiled rice, together with a drier for reducing the water content of the parboiled rice to a predetermined value; means for delivering the parboiled rice from said conditioner to said drier; and means for delivering the parboiled, partially dried paddy containing a predetermined percentage of water to a milling device. Thus, the process of the invention for treating rice for subsequent cooking in cans or in bulk preferably comprises the steps of subjecting the paddy or rough rice to soaking for a predetermined time interval, steaming the soaked rice or paddy at a predetermined pressure and for a predetermined time interval to temper the grain and to parboil the rice, removing a portion of the water content of the rice to bring the water content to a predetermined value, and then milling the parboiled rice containing water to the predetermined value.

Before alluding to the process of the invention in detail, it may be observed that a number of tests have heretofore been conducted by scientists to ascertain the vitamin content, as well as other nutritive constituents of parboiled rice as compared to polished raw rice normally marketed in this country. In general, these tests have established that vitamin $B_1$ is present in parboiled rice to an appreciably greater extent than in the raw milled rice. Moreover, that parboiled rice, polished to the same degree as white milled rice, is generally lower in fat content than the white milled rice, which accounts for its better keeping quality, and is richer in nitrogen and phosphorus. Thus, it has been established that parboiled rice is appreciably higher in nutritive value than raw, polished rice marketed so extensively in this country. Another series of tests also have been heretofore conducted relative to the milling qualities of rough rice or paddy, the tests generally establishing that the drier the rice the lower is the percentage of head rice produced in milling. It is probably well known that the miller receives rice from the grower or jobber in all states of water content, and it is clear that uniformity of water content of the rice is highly desirable. The present invention not only contemplates parboiling of the paddy to a predetermined extent and under predetermined conditions as to afford the most efficaceous product for cooking either in bulk or in cans, but also embraces conditioning of the rough parboiled rice of whatever variety in such uniform manner as to present the same for milling in the most effective state as regards water content to insure the greatest yield of head rice.

The accompanying flow sheet, Fig. 1, of the improved process for treating rice depicts the equipment only schematically. It will be observed, however, that a tank 11 is provided in which a predetermined water level is maintained and in which the rough rice or paddy 12 is disposed from a hopper 13 in communication with a storage bin, not shown. It is to be understood, of course, that the rough rice can be directly placed into the tank of water as it is brought from the thresher rather than from storage. Rotatably mounted in tank 11 are a plurality of agitator paddles 14 which serve to mix the paddy thoroughly with the water and provide what is termed a rice slurry. Preferably, the water in tank 11 with which the paddy is mixed, for thorough soaking thereof, is maintained at normal room temperature, or as it comes from the tap 16, although the water may be warmed to a temperature in the neighborhood of 100° F., if desired, with effective results in shortening the soaking time. It may be observed here that heating of the soaking water in tank 11 to a boiling temperature or higher, has the effect or tendency to speed up the soaking step but has the disadvantage of causing the rice grains to become stained to an undesirable brownish color. To insure a uniformly, substantially white product, I prefer to soak the paddy in cold or tap water, as stated, which soak water is re-used to insure optimum concentration of soluble products from the hulls, thus reducing loss of nutritive constituents to a minimum. The soaking is preferably carried on for a period of four to six hours, more or less, after which the slurry is transferred by any suitable means, such as by a pump 17, having inlet and outlet conduits 18 and 19, respectively, to a rice conditioner 21.

In accordance with the invention, the slurry from the mixing tank 11 is delivered to a compartment or tank 22 of the rice conditioner 21 which comprises, in addition to tank 22, one or more agitators 23 rotatably mounted in the tank for maintaining the paddy in suspension or from settling to the bottom of the tank, an air chamber 24, a steam chamber 26 formed within the air chamber by a hood 27, together with a rotatable filter drum 28 on which the paddy is entrapped and carried, a scraper plate 29 for removing the paddy from the drum, and suitable means for maintaining pressure balances and differentials as well as conduits for taking off water and gases. In general, the construction of the drum 28, filter sections thereon and valve controlled pressure supply pipes is somewhat similar to the device and association of such elements disclosed in Letters Patent No. 919,628. It is believed sufficient to state here, however, that the drum 28 is secured to a hollow driven shaft 31 for rotation therewith and the shaft is so disposed as to cause the drum 28 to be partially submerged in the rice slurry in tank 22. Moreover, the action of the pressure differential means alluded to is to isolate the paddy from the slurry and to entrap the same in a mass or bed on successive portions of the drum 28 as they pass through the slurry, this action also effecting a removal of a quantity of water which is returned ultimately to tank 11 for further use as above stated, through a system of piping passing through hollow shaft 31 and communication with an external pipe 32 leading to a tank 33 where the take-off water from the slurry is purified by filtering and then returned to tank 11 through pipe 34 for re-use in the mixing of the rough rice.

In accordance with the present process, shaft 31 is driven at a relatively slow rate so that the drum 28 revolves slowly. As each section of the drum on which the paddy is entrapped emerges from the tank 33, air from a blower 35 is blown through the mass or bed of paddy in the drum to remove a substantial amount of mechanically entrained water. As the drum 28 rotates further, the entrapped mass of paddy 12 is carried under hood 27 into steam chamber 26 where the paddy is subjected to steaming preferably at a pressure in the neighborhood of fifteen pounds per square inch, the rotation of drum 28 being so regulated that the paddy is subjected to steaming for approximately fifteen minutes, more or less. The pressure in air chamber 24 surrounding the steam chamber 26 is maintained at such value as to balance the steam pressure and hold it at the above stated value. The proportional steaming interval of the rice mass or bed on the drum 28 is regulated by the speed of rotation of the drum and the degree of the arc of the drum covered by the entrapped paddy bed which is enclosed by the hood 27 of the steam chamber 26. After passing through the steam where the paddy is parboiled under the conditions stated the paddy is carried again into air chamber 24 where air is again blown through the entrapped bed to remove an appreciable amount but not all water therefrom, it being understood that after the entrapped rice bed on the drum leaves the air chamber 24 it contains more than fifteen percent of its water absorption capacity. Upon leaving the air chamber 24, the paddy encounters inclined scraper plate 29 which, in conjunction with means, not shown, for equalizing pressures between the inside of the drum and the air space 24, effects the removal of the rice from the drum to pass it downwardly free of tank 22 to a conveyer 36. Any suitable conveyor means 36 can be employed but preferably a screw conveyer is used for moving the rice paddy from the conditioner 21 to a conventional rotatable pressure release device 37 functioning to gradually lower the pressure in the paddy to atmospheric pressure thus preventing likelihood or tendency of the grains to puff or burst.

The wet, parboiled paddy is thereafter conveyed on a suitable belt conveyer 38 to a drier 39, preferably of the conventional rotary drum type through which warm air is continuously blown over the paddy in the direction of the arrow 40 as the paddy passes through the drum at a predetermined rate in the direction of the arrow 40'. A blower 41 together with steam preheater and heater elements 42 and 43 may be employed to supply the warm air to the drier. I have found that if the paddy as delivered from the conditioner is subjected to a temperature in the neighborhood of from 100° F. to 200° F. the requisite drying of the paddy will be effected so that it will emerge from the drier having a moisture content between 11% and 15%. The paddy is then delivered from the rotary drier 39 onto a belt conveyer 44 leading to a second belt conveyer 45 for delivery to suitable milling equipment, not shown.

The foregoing procedure is suitable for batch operations in the main but can readily be converted to continuous handling, soaking, parboiling and drying of the rough rice for delivery to the milling device in a state of most effective water content for highest percentage of head rice. Once the initial batch of rice paddy has been soaked and delivered from tank 11 to the rice conditioner 21, a second quantity of the paddy can be delivered to tank 11 for soaking while the conditioner is operating to effect the isolation, parboiling and partial de-watering of the rice for delivery to the drier and mill. It will be appreciated that the filter sections of the rotating drum 28 of the conditioner will not, in one revolution, pick up or isolate all of the paddy from the rice slurry delivered to tank 22 of the conditioner. Thus rotation of the drum 28 is continued until no more of the paddy remains in the slurry. The second charge of slurry in tank 11 is delivered to the conditioner only after the paddy has soaked in the water tank 11 for the requisite soaking period. It is, of course, also understood that the drum 28 can be made to any desired diameter and length so as to provide desired surface area on its periphery. The size of the drum, the capacity of the tank 22, the capacity of air compartment 24 as well as of the steam chamber 26 are matters of engineering design and can readily be worked out. If desired, take-off pipes from the steam chamber 26 can be connected to a conduit 46 leading to the preheater 42 of the drier heating elements.

While a preferred system for the treatment of rough rice or paddy preparatory to milling thereof and cooking has been depicted, it is to be appreciated that the process of my invention need not be carried out by the specific equipment shown nor in precisely the same manner, as the method of my invention can effectively be carried out in many ways. So it is sufficient to state here that after soaking of the paddy in either cold or warm water for the desired time interval, the paddy can be removed from the slurry and excess water removed therefrom, and then the paddy can be placed in an autoclave and subjected to steaming for fifteen minutes, more or less, at a steam pressure of approximately fifteen pounds per square inch. Thereafter, the parboiled rough rice is removed from the autoclave and spread out in a drying room maintained at a predetermined temperature, preferably around 100° F., the parboiled paddy being left in the drying room for a predetermined time interval, depending on the quantity of the paddy being treated, so that upon withdrawal from the drying room for delivery to the milling machine, the paddy will have a water content in the neighborhood of eleven per cent (11%) to fifteen per cent (15%).

Referring to Figures 2 and 3 of the drawing, it will be observed from the showing of Figure 2 that the rice grain not treated in accordance with the improved process is mushy or pasty and has an elongated shape, this view showing the grain as taken from a can of short-grain raw rice that has been milled, polished, cooked and canned. The showing of Figure 3 is illustrative of the shape and condition of the rice grain of the same short-grain variety after it has been treated in accordance with our process, including cooking and canning. It is to be noted that the grain is not mushy or pasty but is firm because tempered in the parboiling of the paddy in the manner above explained which treatment, in addition, removes the bland flavor without the necessity of brine treatment. It also is to be observed, by reference to Figure 3, that treatment of the rough rice in accordance with the improved method not only tempers the grain but also swells the grain so that its shorter axis is enlarged and the grain takes the shape or configuration of the internal shape of the hull.

After the rough paddy has been treated in accordance with the foregoing process and milled in accordance with standard milling practice, the milled, parboiled rice may either be packed in bulk for home cooking or the same can be delivered for boiling and canning. For home cooking, the parboiled, milled rice can be cooked in the same manner as raw rice that has not been parboiled. In other words, the rice treated in accordance with the improved process can be placed in a double boiler with an excess of water and cooked for fifteen or twenty minutes. Of course, the rice is first washed in a colander with clean, cold water to remove dust and other extraneous material. After cooking for the requisite period of time the rice may be served hot or can be cooled, as desired.

An effective canning procedure for the rice treated and milled in accordance with my process is carried out by first washing or rinsing the milled, parboiled rice in a colander in cold running water to remove dust and any other extraneous material and then heating the rice in water to substantially a boiling temperature. The rice is stirred constantly during the heating thereof to keep from settling and the temperature is maintained at the stated value. Thereafter, the water is drained and the rice is then packed into cans but not compressed, and the cans vacuum sealed in accordance with standard methods. In order to destroy pathogenic or spoilage organisms, the sealed containers are heat processed, preferably by steam under pressure and thereafter cooled. In carrying out the heat processing, the cans are placed in a cradle, and the cradle is disposed in an autoclave. With the lid of the autoclave closed, live steam is blown therethrough with vents open to remove all air from the autoclave. Thereafter, the vents are closed and steam admitted for approximately thirty minutes at atmospheric pressure until a temperature of approximately 210° F. is reached. Then the steam pressure is raised to fifteen pounds above atmospheric at a temperature of approximately 240° F. which is maintained for approximately fifty minutes. Thereafter, pressure is released, steam shut off entirely and the lid of the autoclave opened. The autoclave is allowed to cool for about ten minutes and cold water run therein so as to cover the cans, the cans being agitated in the cold water. When the temperature has been reduced to around 80° F. to 85° F., the cans are lifted from the autoclave and packed in a case. The essence of the improved process of my invention is that the treatment so tempers the rice grains that they will withstand severe conditions required in canning regulations without becoming of undesirable consistency and unpalatable.

The foregoing treating, milling and canning steps have been successfully carried out with so-called Cal-Jap and Caladay rice, both short grain variety grown in California. The canned boiled rice is non-pasty, light in color and palatable with no gritty grains. Furthermore, the canned product does not become stiff and gelatinous but retains its non-pasty, whole grain condition indefinitely.

I claim:

1. A process of treating rice for subsequent cooking and canning, said process consisting of the steps of soaking rice paddy in water at a temperature approximating 100° F. for a period of from four to six hours, isolating the rice paddy from the water and removing a substantial amount of the entrained water therefrom, then steaming the rice paddy for a period of approximately fifteen minutes at a pressure of approximately fifteen pounds per square inch, and then drying the parboiled rice to remove additional water therefrom down to a water content in the neighborhood of eleven to fifteen per cent.

2. A process of treating, cooking and canning rough rice, said process comprising the steps of soaking the paddy in water at temperature of approximately 100° F., for a period ranging between four to six hours, parboiling the soaked paddy at fifteen pounds steam pressure for approximately fifteen minutes, removing all but approximately thirteen per cent of the water from the soaked and parboiled paddy, milling the paddy containing approximately thirteen per cent water, canning the milled, parboiled rice, and then subjecting the canned rice to controlled temperature and time factors not exceeding 240° F. and for not less than fifty minutes.

3. Process of treating rough rice for cooking and canning to afford a boiled rice which is light in color, non-gritty and non-pasty, said process consisting of the steps of soaking rice paddy in hot water a sufficient length of time to soften the rice hull, isolating the rice paddy from the water and removing a substantial amount of the entrained water therefrom, then parboiling the rice paddy by steaming the same for a period of approximately fifteen minutes at a pressure of approximately fifteen pounds per square inch, then drying the parboiled rice paddy to remove additional water therefrom down to a water content in the neighborhood of eleven to fifteen percent, and milling the rice paddy while containing said reduced water content.

MILTON YONAN-MALEK.